March 11, 1924.

H. L. BERTIN 1,486,411

MACHINE FOR THE MANUFACTURE OF MILLING CUTTERS WITH CONSTANT PROFILE

Filed March 25, 1922   2 Sheets-Sheet 1

Inventor
H. L. Bertin,
By Marks & Clerk
Attys.

March 11, 1924.
H. L. BERTIN
1,486,411
MACHINE FOR THE MANUFACTURE OF MILLING CUTTERS WITH CONSTANT PROFILE
Filed March 25, 1922   2 Sheets-Sheet 2
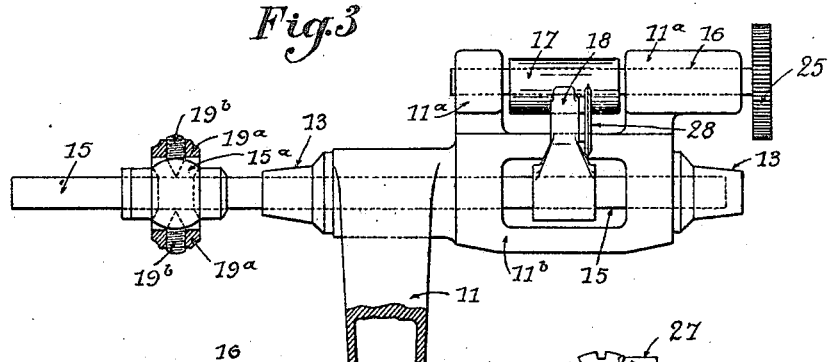
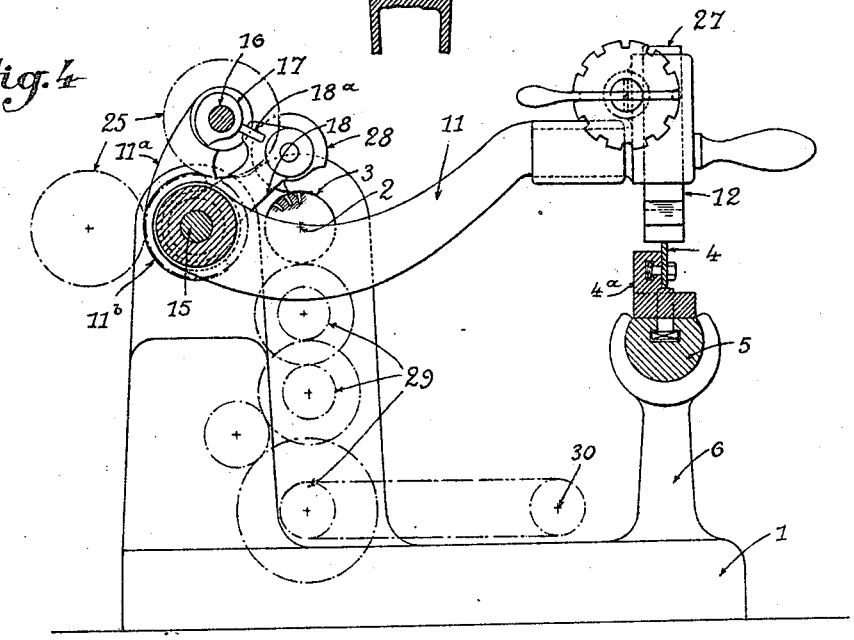
Inventor
H L Bertin,
By Marks&Clerk
Attys.

Patented Mar. 11, 1924.

1,486,411

UNITED STATES PATENT OFFICE.

HENRI LÉON BERTIN, OF PARIS, FRANCE.

MACHINE FOR THE MANUFACTURE OF MILLING CUTTERS WITH CONSTANT PROFILE.

Application filed March 25, 1922. Serial No. 546,736.

*To all whom it may concern:*

Be it known that I, HENRI LÉON BERTIN, citizen of the French Republic, residing at Paris, in the Republic of France, have invented new and useful Improvements in Machines for the Manufacture of Milling Cutters with Constant Profile, of which the following is a specification.

My invention relates to a machine for the manufacture of milling cutters with constant profile, for example the cutters used in shoe manufacture.

In the accompanying drawings given by way of example:

Fig. 3 is an explanatory detail view, partially reproducing Fig. 1.

Fig. 4 is an end elevation of the machine.

Figure 1:
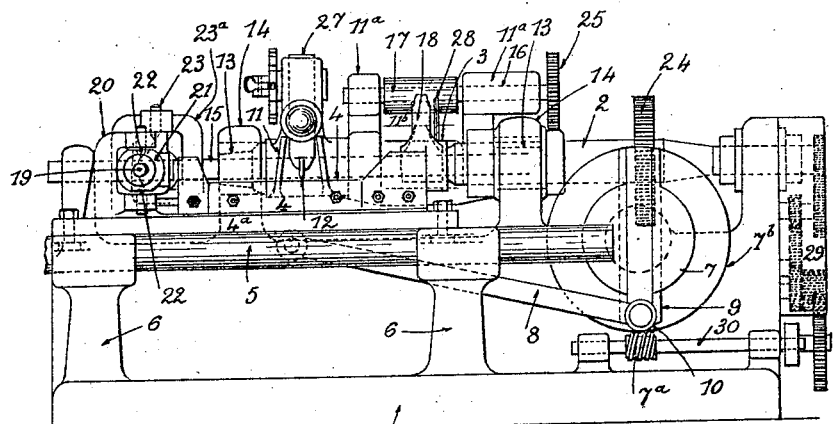
Fig. 1 is an elevation view of a machine for the manufacture of milling cutters with constant profile in accordance with the invention.

In the example shown, the machine comprises a main frame 1 carrying a horizontal shaft 2 having mounted on one end thereof the milling cutter 3 to be relieved or backed off. The shaft 2 is actuated by the pulley 26, (Fig. 1) through the intermediary of the gearing 24.

A reproducing template 4 (Figs. 2 and 4) of sheet steel having a profile corresponding to the shape of the milling cutter to be obtained is mounted in a template holder $4^a$ which is in turn secured to a carriage or slidable bar 5 adapted to slide in the lengthwise direction in supports 6 forming part of the main frame. The carriage 5 and template 4 are given a straight reciprocating motion, and to this end the said carriage is connected by a connecting rod 8 with a crank pin 10 (Figs. 1 and 2) secured to a slide 9 disposed upon a crank disc 7. The slide 9 can be displaced in a diametral groove in the disc in order to regulate the stroke of the carriage 5 and the template 4.

The crank disc 7 is secured to a worm wheel $7^b$ actuated by a worm $7^a$ mounted on a shaft 30 which is driven by the cutter arbor 2 by means of the gearing 29, Fig. 4, and a chain or belt.

Figure 2:
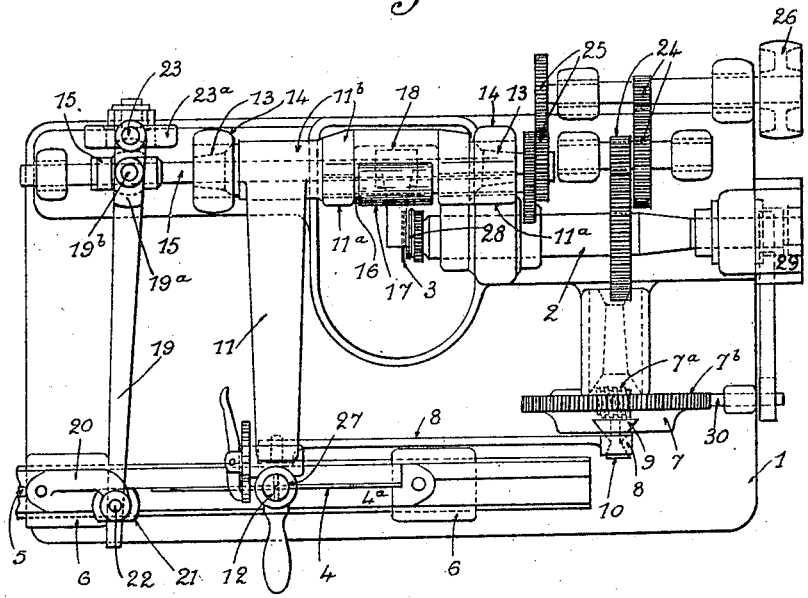
Fig. 2 is a corresponding plan view.

A swinging lever 11 (Figs. 2 and 4) has at one end thereof a finger 12 adapted to bear upon the template 4. This finger 12 is mounted on a plunger 27 (Fig. 4) whose vertical position can be regulated according to the depth of cut which is to be given to the tool. The other end $11^b$ of the lever 11, which has a sleeve like shape is provided with two conical journals 13 whereby the said lever is enabled to pivot in the two bearings 14. This end $11^b$ carries two bosses $11^a$ having revoluble therein a small shaft 16 which has mounted thereon a spiral shaped cam 17 (Fig. 4) and is driven by the pulley 26 through the intermediary of the gearing 25, (Fig. 2).

Extending axially through the sleeve shaped part $11^b$ of the lever 11, is a slidable horizontal shaft 15 having mounted thereon the tool-holder arm 18 carrying the tool 28 which will act upon the milling cutter 3 to be relieved. The arm 18 is also provided with a finger $18^a$ in contact with the cam 17, and in this manner the rotation of the cam will cause the tool-holder to swing and give such movement to the tool 28 as is necessary for the operation of relieving.

On the left end of the template holder $4^a$, (Figs. 1 and 2) is mounted a bracket 20 having two centers 22 situated on a common vertical axis, and between which is disposed a sleeve 21 traversed axially by the end of a lever 19 which pivots at the other end between two centers 23 situated on a common vertical axis and carried by a support $23^a$ secured to the main frame. The lever 19 is provided at $19^a$ (Figs. 2 and 3) with an aperture which is traversed by the shaft 15 carrying the tool-holder 18. In the said aperture are mounted two centers with vertical axes $19^b$ engaging a sleeve $15^a$ which is mounted on the shaft 15.

When the template 4 effects a lengthwise reciprocating movement under the action of the crank disc 7 and the connecting rod 8, the centers 22 will entrain the sleeve 21. The lever 19 will swing horizontally about the centers 23 and will cause the shaft 15 to assume a lengthwise reciprocating motion of reduced amplitude. The tool-holder 18 carried by the shaft 15 will thus effect together with the tool a like reciprocating motion along the axis of the milling cutter to be machined. Furthermore, the template 4 in its reciprocating movement will act on the finger 12 and will thus effect the vertical swing of the lever 11; this will cause the cam 17, the finger $18^a$, the tool-holder 18 and the tool 28 to more or less approach the milling cutter under treatment 3, and the tool is thus enabled to give to the said cutter the desired radius at the point in question and to carry out the relieving operation by the action of the cam 17.

To facilitate the movement of the finger 12 along the template 4, the latter is amplified ten times in the length and only five times in height, in proportion to the dimensions of the milling cutter under treatment, and this provides a flattened profile which is more readily followed. The reduction ratios of the levers 11 and 19 will restore the normal profile.

It should be observed that the speed ratio of the shafts 2 and 16 will depend upon the number of teeth to be cut upon the said milling cutter.

Inasmuch as certain parts of the profiles are common to different forms of milling cutters for shoe manufacture, the templates are executed in sections which may be suitably combined.

It is obvious that although the said machine has been more especially devised in connection with milling cutters for shoe manufacture, it is equally applicable to all other milling cutters with constant profile.

Having now described my invention, I declare that what I claim as new and desire to secure by Letters Patent is:

1. A machine for cutting and relieving milling cutters comprising a work carrying shaft adapted to support the milling cutter to be acted upon, means for rotating said work carrying shaft, a cutting tool, a rotary cam for actuating said tool, means for rotating said cam, a template, means actuated by said template for displacing the cutting tool along the axis of the work, means actuated also by said template for displacing the cutting tool in a plane at right angles to the axis of the work and means for imparting to said template a reciprocating movement.

2. A machine for cutting and relieving milling cutters comprising a work carrying shaft adapted to support the milling cutter to be acted upon, means for rotating said work carrying shaft, a cutting tool, a rotary cam for actuating said tool, a cam shaft carrying said cam, means for rotating said cam shaft, an oscillating lever having its axis of rotation parallel to the axis of the work, said lever carrying said cam shaft, a tool holder for said cutting tool, an oscillating lever adapted to impart to said tool holder a movement along the axis of the work, a template adapted to actuate both of said oscillating levers and means for imparting to said template a reciprocating movement.

3. A machine for cutting and relieving milling cutters comprising a work carrying shaft adapted to support the milling cutter to be acted upon, means for rotating said work carrying shaft, a cutting tool, a rotary cam for actuating said tool, a cam shaft carrying said cam, means for rotating said cam shaft, an oscillating lever having its axis of rotation parallel to the axis of the work, said lever having an axial sleeve like portion and two arms in which the said cam shaft is rotatably supported, a tool holder for said cutting tool, a tool holder shaft carrying said tool holder, said latter shaft being adapted to rotate and to slide axially through the sleeve portion of the said oscillating lever, a second oscillating lever adapted to move the said tool holder shaft in an axial direction, a template adapted to actuate both of said oscillating levers and means for imparting to said template a reciprocating movement.

4. A machine for cutting and relieving milling cutters comprising a work carrying shaft adapted to support the milling cutter to be acted upon, means for rotating said work carrying shaft, a cutting tool, a rotary cam for actuating said tool, a cam shaft carrying said cam, means for rotating said cam shaft, an oscillating lever having its axis of rotation parallel to the axis of the work, said lever having an axial sleeve like portion and two arms in which the said cam shaft is rotatably supported, a tool holder for said cutting tool, a tool holder shaft carrying said tool holder, said latter shaft being adapted to rotate and to slide axially through the sleeve portion of the said oscillating lever, a sleeve on said tool holder shaft, a second oscillating lever, centers on said second oscillating lever between which the sleeve is pivoted, stationary centers between which the second oscillating lever is pivoted, a template adapted to actuate both of said oscillating levers, a template holder, centers on said template holder, a guiding sleeve for the second oscillating lever, mounted between said last named centers and means for imparting to said template holder a reciprocating movement.

5. A machine for cutting and relieving milling cutters comprising a work carrying shaft adapted to support the milling cutter to be acted upon, means for rotating said work carrying shaft, a cutting tool, a rotary cam for actuating said tool, means for rotating said cam, a template, means actuated by said template for displacing the cutting tool along the axis of the work, means actuated also by said template for displacing the cutting tool in a plane at right angles to the axis of the work and means including a crank pin with variable radius for imparting to said template a reciprocating movement.

6. A machine for cutting and relieving milling cutters comprising a work carrying shaft adapted to support the milling cutter to be acted upon, means for rotating said work carrying shaft, a cutting tool, a rotary cam for actuating said tool, means for rotating said cam, a template, means actuated by said template for displacing the cutting tool along the axis of the work, means actuated also by said template for displacing the cutting tool in a plane at right angles to the axis of the work, a crank disc having a crank pin with adjustable radius, means operated by said crank disc for imparting to said template a reciprocating movement and means embodying a worm gear for operatively connecting the said crank disc to the work carrying shaft.

In testimony whereof I have signed my name to this specification.

HENRI LÉON BERTIN.